(12) United States Patent
Yoon et al.

(10) Patent No.: US 9,857,877 B2
(45) Date of Patent: Jan. 2, 2018

(54) APPARATUS AND METHOD OF RECOGNIZING MOVEMENT OF SUBJECT

(71) Applicant: Samsung Electronics Co., Ltd., Suwon-si, Gyeonggi-do (KR)

(72) Inventors: Heesun Yoon, Seoul (KR); Jangwoo You, Seoul (KR); Myungjae Jeon, Yongin-si (KR); Yonghwa Park, Yongin-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 38 days.

(21) Appl. No.: 14/624,715

(22) Filed: Feb. 18, 2015

(65) Prior Publication Data
US 2016/0054812 A1  Feb. 25, 2016

(30) Foreign Application Priority Data

Aug. 25, 2014 (KR) ........................ 10-2014-0110958

(51) Int. Cl.
| | | |
|---|---|---|
| *G06F 3/01* | (2006.01) | |
| *G06F 1/16* | (2006.01) | |
| *G06F 3/03* | (2006.01) | |
| *G06F 3/042* | (2006.01) | |
| *G06F 3/0488* | (2013.01) | |

(52) U.S. Cl.
CPC .............. *G06F 3/017* (2013.01); *G06F 1/163* (2013.01); *G06F 3/0304* (2013.01); *G06F 3/0425* (2013.01); *G06F 3/04883* (2013.01)

(58) Field of Classification Search
CPC ........... G06F 2203/04109; G06F 3/042; G06F 3/0421; G06F 3/0423; G06F 3/0428; G06F 3/0325; G06F 3/017
See application file for complete search history.

(56) References Cited

U.S. PATENT DOCUMENTS

| | | | |
|---|---|---|---|
| 7,042,490 B2* | 5/2006 | Numazaki | G06F 3/0304 348/131 |
| 9,398,200 B2 | 7/2016 | You et al. | |
| 2007/0103441 A1* | 5/2007 | Kong | G06F 3/0421 345/166 |
| 2011/0205155 A1* | 8/2011 | Newton | G06F 3/011 345/157 |
| 2011/0310005 A1* | 12/2011 | Chen | G06F 1/3203 345/156 |

(Continued)

FOREIGN PATENT DOCUMENTS

| | | |
|---|---|---|
| KR | 20100068222 A | 6/2010 |
| KR | 20110138975 A | 12/2011 |

(Continued)

*Primary Examiner* — Premal Patel
(74) *Attorney, Agent, or Firm* — Harness, Dickey & Pierce, P.L.C.

(57) ABSTRACT

Provided is an apparatus and method of recognizing a movement of a subject. The apparatus includes a light source configured to emit light to the subject and an image sensor configured to receive light reflected from the subject. The apparatus includes a processor configured to detect a pixel that is receiving the reflected light, the pixel being included in a pixel array of the image sensor. The processor is configured to track the movement of the subject based on a change in a position of the detected pixel.

17 Claims, 10 Drawing Sheets

(56) References Cited

U.S. PATENT DOCUMENTS

| | | | |
|---|---|---|---|
| 2012/0061568 A1* | 3/2012 | Lee | G06K 9/00335 250/338.1 |
| 2012/0113210 A1 | 5/2012 | Kim et al. | |
| 2012/0120065 A1 | 5/2012 | Kim et al. | |
| 2012/0154537 A1* | 6/2012 | Chang | H04N 5/2256 348/46 |
| 2013/0011045 A1 | 1/2013 | Lee et al. | |
| 2014/0168369 A1* | 6/2014 | Crane | H04N 13/0253 348/46 |
| 2014/0347445 A1 | 11/2014 | Yoon et al. | |

FOREIGN PATENT DOCUMENTS

| | | |
|---|---|---|
| KR | 20120126508 A | 11/2012 |
| KR | 20130091194 A | 8/2013 |
| KR | 20140016987 A | 2/2014 |
| KR | 20150064992 A | 6/2015 |

\* cited by examiner

APPARATUS AND METHOD OF RECOGNIZING MOVEMENT OF SUBJECT

RELATED APPLICATION

This application claims the benefit of Korean Patent Application No. 10-2014-0110958, filed on Aug. 25, 2014, in the Korean Intellectual Property Office, the disclosure of which is incorporated herein in its entirety by reference.

BACKGROUND

1. Field

At least one example embodiment relates to apparatuses and/or methods of recognizing a movement of a subject, and more particularly, to apparatuses and/or methods of recognizing a three-dimensional (3D) movement of a subject by using a light source and an image sensor.

2. Description of the Related Art

According to recent developments in image processing technology, an image processing apparatus recognizes a movement of a subject by using three-dimensional (3D) information, for example, by using a depth camera or a stereo camera. In particular, the depth camera uses a time of flight (ToF) scheme that measures a time taken for emitted light to be reflected from an object.

As such, in order to perform image processing using 3D information, power used for various modulation processes is consumed or an additional software (SW) resource such as a filter used for various image processing tasks is required. That is, in order to more precisely recognize a movement of a subject, many processing tasks using hardware or software are required, and thus increased processing power is consumed.

SUMMARY

At least one example embodiment provides apparatuses and/or methods of recognizing a movement of a subject by using a light source and an image sensor.

At least one example embodiment provides computer-readable recording media having embodied thereon programs for executing the methods in computers. Additional aspects will be set forth in part in the description which follows and, in part, will be apparent from the description, or may be learned by practice of example embodiments.

According to at least one example embodiment, an apparatus for recognizing a movement of a subject includes: a light source configured to emit light to the subject; an image sensor configured to receive light reflected from the subject; and a processor configured to detect a pixel that is receiving the reflected light, the pixel being included in a pixel array of the image sensor. The processor is configured to track the movement of the subject based on a change in a position of the detected pixel.

According to at least one example embodiment, the apparatus includes a filter configured to filter the reflected light to transmit light having a desired wavelength. The processor is configured to detect a pixel using the transmitted light having the desired wavelength.

According to at least one example embodiment, the processor is configured to set a reference value for an intensity of light, and detect a pixel having an intensity that is greater than the reference value.

According to at least one example embodiment, the pixel is in a plurality of pixels in the pixel array, and the processor is configured to detect a pixel is located at a central position among the plurality of pixels.

According to at least one example embodiment, the processor is configured to calculate a distance by which the subject moves based on an amount of the change in the position of the detected pixel.

According to at least one example embodiment, the apparatus includes a lens configured to collect the reflected light such that the image sensor receives the reflected light collected by the lens.

According to at least one example embodiment, the apparatus includes a recognizer configured to recognize a pattern according to the change in the position of the detected pixel.

According to at least one example embodiment, the light source is configured to emit light that passes through an opening.

According to at least one example embodiment, the apparatus includes a display configured to display a pattern according to the change in the position of the detected pixel.

According to at least one example embodiment, a method of recognizing a movement of a subject includes emitting, by a light source, light to the subject and receiving, by an image sensor, light reflected from the subject. The method includes detecting a pixel that is receiving the reflected light, the pixel being included in a pixel array of the image sensor. The method includes tracking the movement of the subject based on a change in a position of the detected pixel.

According to at least one example embodiment, the method includes filtering the reflected light to transmit light having a desired wavelength, and the detecting comprises detecting a pixel using the transmitted light having the desired wavelength.

According to at least one example embodiment, the detecting comprises setting a reference value for an intensity of light, and detecting a pixel having an intensity that is greater than the reference value.

According to at least one example embodiment, the pixel is in a plurality of pixels in the pixel array, and the detecting comprises detecting a pixel that is located at a central position among the plurality of pixels.

According to at least one example embodiment, the method includes calculating a distance by which the subject moves based on an amount of the change in the position of the detected pixel.

According to at least one example embodiment, the receiving light reflected from the subject comprises receiving the light reflected from the subject through a lens.

According to at least one example embodiment, the method includes recognizing a pattern according to the change in the position of the detected pixel.

According to at least one example embodiment, the light emitted to the subject is light that passes through an opening.

According to at least one example embodiment, the method includes displaying a pattern according to the change in the position of the detected pixel.

According to at least one example embodiment is directed to a non-transitory computer-readable recording medium having embodied thereon a program for executing the above method.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION OF EXAMPLE EMBODIMENTS

Inventive concepts will now be described more fully with reference to the accompanying drawings, in which example embodiments of are shown. These example embodiments are provided so that this disclosure will be thorough and complete, and will fully convey inventive concepts of to those skilled in the art. Inventive concepts may be embodied in many different forms with a variety of modifications, and a few embodiments will be illustrated in drawings and explained in detail. However, this should not be construed as being limited to example embodiments set forth herein, and rather, it should be understood that changes may be made in these example embodiments without departing from the principles and spirit of inventive concepts, the scope of which are defined in the claims and their equivalents. Like numbers refer to like elements throughout. In the drawings, the thicknesses of layers and regions are exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., electronic imaging systems, image processing systems, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASICs), field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible or non-transitory machine readable mediums for storing information. The term "computer-readable medium" may include, but is not limited to, portable or fixed storage devices, optical storage devices, and various other tangible or non-transitory mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "and/or" includes any and all combinations of one or more of the associated listed items. Expressions such as "at least one of," when preceding a list of elements, modify the entire list of elements and do not modify the individual elements of the list.

Inventive concepts will now be described more fully with reference to the accompanying drawings, in which example embodiments are shown.

Figure 1:
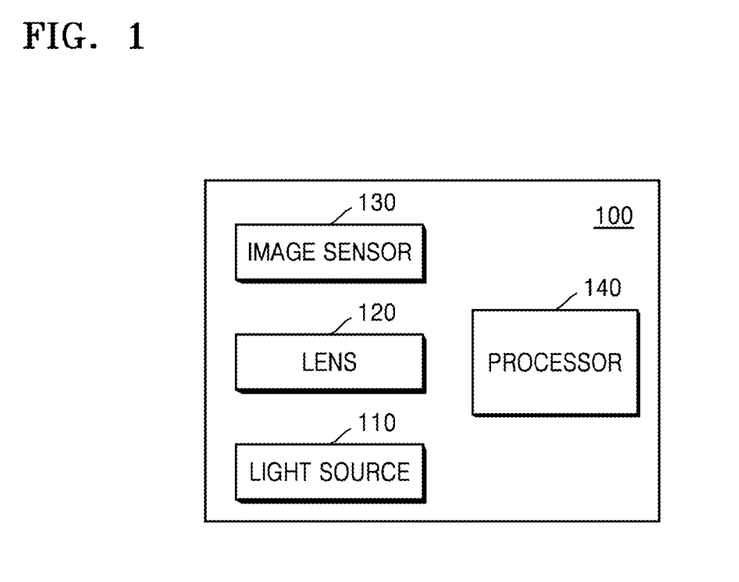
FIG. 1 is a block diagram illustrating an apparatus for recognizing a movement of a subject, according to at least one example embodiment.

FIG. 1 is a block diagram illustrating an apparatus 100 for recognizing a movement of a subject, according to at least one example embodiment. Hereinafter, the apparatus 100 for recognizing a movement of a subject will be referred to as the apparatus 100 for convenience. According to an embodiment, the apparatus 100 may include a light source 110, a lens 120, an image sensor 130, and a processor 140. It should be understood that the apparatus 100 is not limited to the elements shown in FIG. 1. Accordingly, it will be understood by one of ordinary skill in the art that the apparatus 100 may further include general-purpose elements other than or in addition to the elements shown in FIG. 1.

According to at least one example embodiment, the light source 110 may emit light to the subject. For example, the light source 110 may be a light-emitting diode (LED) that may emit light having a near-infrared (NIR) wavelength of about 850 nm, which is not detected by the human eye for safety, or a laser diode (LD). However, example embodiments are not limited to one wavelength band and one type of light source. Also, the light source 110 may emit light at a preset angle, and the light may be light that passes through an opening (e.g., a slit). Also, the light source 110 may emit light having a desired (or alternatively, predetermined) wavelength such as infrared light.

According to at least one example embodiment, when the light emitted by the light source 110 is reflected by the subject, the lens 120 may collect part of the reflected light. According to at least one example embodiment, the lens 120 may be a convex lens and may send the collected light to the image sensor 130.

According to at least one example embodiment, the image sensor 130 may receive the light collected by the lens 120. The image sensor 130 may include a pixel array, and a specific pixel in the pixel array may receive the light collected by the lens 120. According to at least one example embodiment, the image sensor 130 may be a complementary metal-oxide-semiconductor (CMOS) image sensor (CIS) and may include a two-dimensional position sensitive detector (2D-PSD) or a 2D-photodiode (PD).

According to at least one example embodiment, the processor 140 may detect a pixel for receiving the light collected by the lens 120 in the pixel array of the image sensor 130 and may recognize a position of the subject. That is, since a position of the pixel for receiving the light reflected from the subject and collected by the lens 120 may vary according to the position of the subject, the processor 140 may recognize the position of the subject by detecting the pixel for receiving the reflected and collected light in the pixel array that is a 2D pixel array. According to at least one example embodiment, when the processor 140 detects a specific pixel for receiving light, the processor 140 detects the specific pixel for receiving light in the image sensor 130 and recognizes a position of the specific pixel in the pixel array. Accordingly, the position of the detected pixel and the position of the subject may correspond to each other in a one-to-one manner.

Also, according to at least one example embodiment, the processor 140 may track a movement of the subject based on a change in the position of the detected pixel. That is, the processor 140 may detect the change in the position of the pixel for receiving the reflected and collected light according to the movement of the subject and may track the movement of the subject by using the change in the position of the detected pixel.

According to at least one example embodiment, the processor 140 may set a critical value (or reference value) for an intensity of light and may detect a pixel for receiving light having a greater intensity than the set critical value from among the collected light. Alternatively, when a plurality of pixels for receiving the collected light are provided in the pixel array, the processor 140 may detect a pixel that is located at a central position from among the plurality of pixels and may recognize the position of the subject.

Also, according to at least one example embodiment, the processor 140 may set an optimal resolution which the image sensor 130 may recognize by adjusting a distance between the light source 110 and the subject and an angle at which the light source 110 emits the light to the subject. That is, the processor 140 may adjust a ratio of a distance by which the subject moves to the amount of the change in the position of the pixel by adjusting the angle at which the light is emitted.

Also, according to at least one example embodiment, the processor 140 may calculate the distance by which the subject moves based on the amount of the change in the position of the detected pixel, which will be explained below in detail with reference to FIGS. 3A and 3B.

Figure 2:
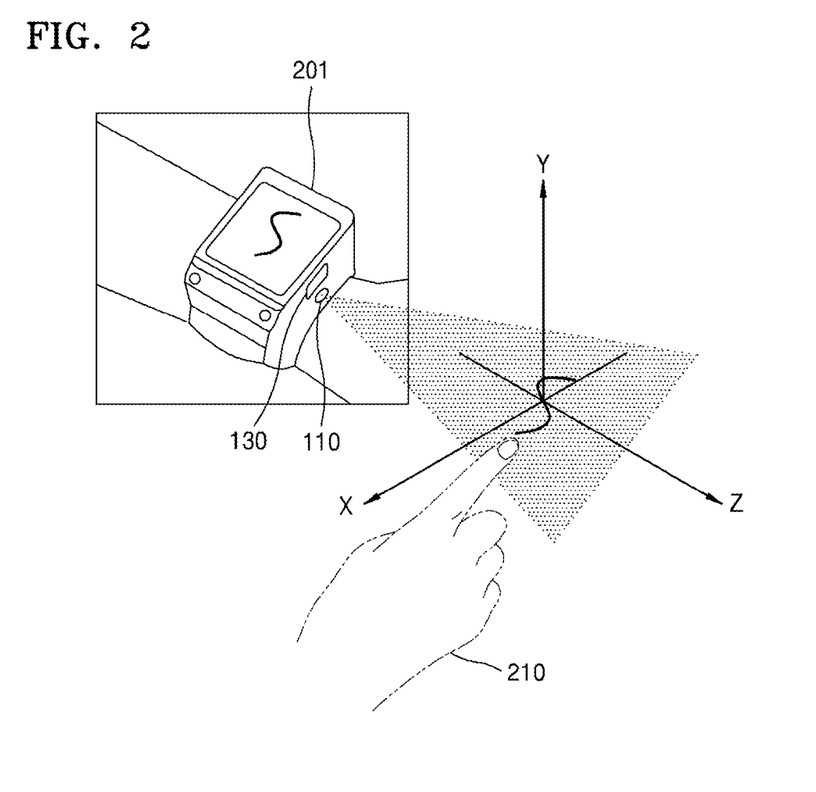
FIG. 2 is a view for explaining an example where the apparatus is mounted in a wearable device and tracks a movement of a subject, according to at least one example embodiment.

FIG. 2 is a view illustrating an example where the apparatus 100 is mounted on a wearable device and tracks a movement of a subject, according to at least one example embodiment. Although the apparatus 100 is mounted on a side surface of the wearable device 201 in FIG. 2, example embodiments are not limited thereto and the apparatus 100 may be mounted on a portable device such as a smart phone and on any surface of the portable device. Also, although the processor 140 of FIG. 1 is not shown in FIG. 2, the processor 140 is provided in the apparatus 100.

As shown in FIG. 2, the light source 110 may emit light that passes through a slit to a subject 210, and the emitted light may be reflected from the subject 210. Next, the reflected light may be collected by the lens 120 (not shown) and may be focused on the image sensor 130.

Accordingly, the processor 140 may detect a pixel for receiving the collected light in the pixel array that is included in the image sensor 130, may detect a change in a position of the pixel for receiving the collected light according to a movement of the subject 210, and may track the movement of the subject 210 by using the change in the position of the detected pixel.

That is, according to at least one example embodiment, the subject 210 may move along x, y, and z-axes, which are three-dimensional (3D) coordinate axes. For example, the subject 210 moves along the x and z-axes to form a sine wave as shown in FIG. 2. While the subject 210 moves to form the sine wave, the processor 140 may detect the change in the position of the pixel according to the movement of the subject 210 and may display a pattern according to the change in the position of the detected pixel on a display unit of a wearable device 201. Also, the apparatus 100 may display the pattern according to the change in the position of the detected pixel by using a separate display unit.

Accordingly, the apparatus 100 may include a light source and an image sensor and may track a movement of a subject by detecting a pixel of the image sensor, position of the pixel corresponding in a one-to-one manner to a position of the subject. Thus, the apparatus 100 may track the movement of a subject without performing image processing such as depth calculation or image filtering. Consequently, power consumption may be reduced due to the exclusion of hardware or software used for such operations.

Figure 3A:
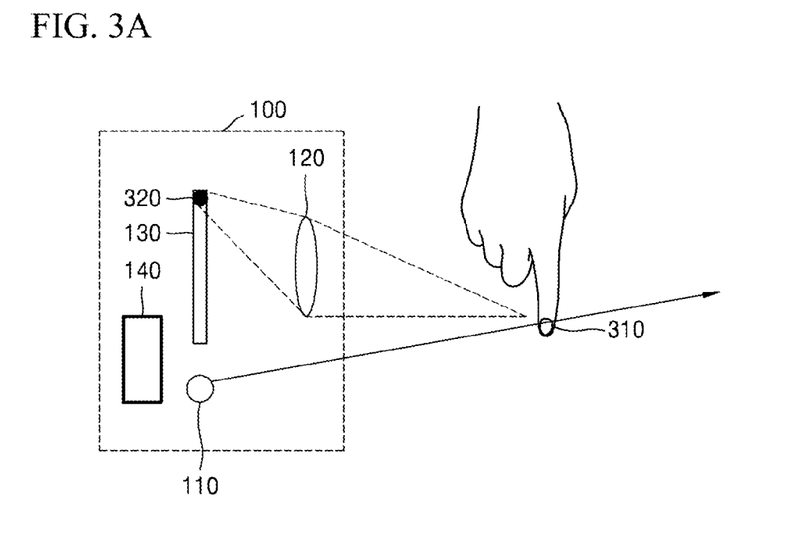
FIGS. 3A and 3B are views for explaining a method performed by the apparatus to track a movement of a subject along a z-axis of FIG. 2, according to at least one example embodiment.
Figure 3B:
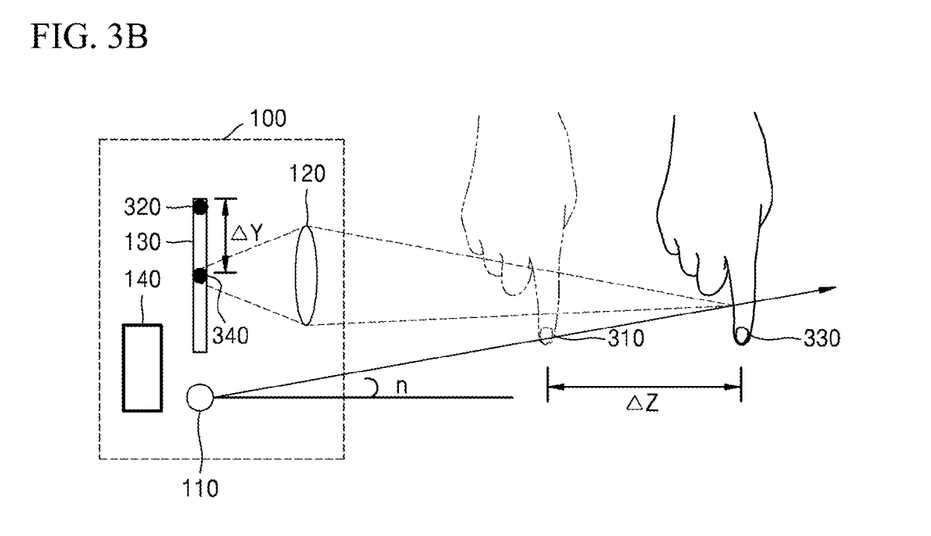

FIGS. 3A and 3B are views for explaining a method performed by the apparatus 100 to track a movement of a subject along the z-axis of FIG. 2, according to at least one example embodiment. FIGS. 3A and 3B illustrate the apparatus 100 seen in a negative direction (opposite to a direction marked by an arrow) of the x-axis of FIG. 2. The following will be explained on the assumption that the subject is a finger. Also, although each element of the apparatus 100 is larger than the finger in FIGS. 3A and 3B for convenience, a ratio of a size of the finger to a size of the apparatus 100 is not limited to that in FIGS. 3A and 3B. In other example embodiments, a ratio of a size of a subject to each of elements of the apparatus 100 is not limited to that shown in FIGS. 3A and 3B.

Referring to FIG. 3A, the light source 110 emits light that passes through a slit to the finger at a desired (or alternatively, predetermined) angle. Part of the emitted light is scattered and reflected from the finger. The scattered and reflected light is collected by the lens 120 and is focused on a position 320 of a pixel of the image sensor 130 including the pixel array.

Accordingly, the processor 140 may detect the pixel for receiving the collected light that is located at the position 320 in the image sensor 130 and may recognize a position 310 of the finger by detecting the pixel that is located at the position 320 corresponding to the position 310 of the finger. A process performed by the processor 140 to detect the pixel that is located at the position 320 in the image sensor 130 will be explained below in detail with reference to FIG. 7.

Referring to FIG. 3B, the finger moves from the position 310 of FIG. 3A to a position 330. Like in FIG. 3A, part of light emitted from the light source 110 is scattered and reflected from the finger. The scattered and reflected light is collected by the lens 120 and is focused on a pixel that is located at a position 340 in the image sensor 130.

Accordingly, the processor 140 may detect the pixel for receiving the collected light that is located at the position 340 in the image sensor 130 and may recognize the position 330 of the finger by detecting the pixel that is located at the position 340 corresponding to the position 330 of the finger. Also, as the finger moves from the position 310 to the position 330, the processor 140 may detect that the pixel for receiving the collected light in the image sensor 130 changes from the position 320 to the position 340, may detect a change in a position of the pixel for receiving the collected light according to a movement of the finger, and may track the movement of the finger by using the detected change in the position of the pixel. Also, the processor 140 may recognize that as the finger moves farther away from the light source 110, the position of the pixel for receiving the collected light in the image sensor 130 moves closer to the light source 110.

Also, the processor 140 may calculate the amount of a change in a position of the finger by using the amount of the change in the position of the pixel. As shown in FIG. 3B, when the amount of the change in the position of the finger is ΔZ, the amount of the change in the position of the pixel is ΔY, an angle between the light which the light source 110 emits and a horizontal surface is n, and a magnification of the lens 120 is m, the amount of the change in the position of the finger ΔZ is calculated as follows:

$$\Delta Z = \frac{\cos n}{m \times \sin n} \times \Delta y. \qquad (1)$$

However, Equation 1 contains desirable values, and thus an error due to refraction and scattering in air needs to be considered.

Figure 4A:
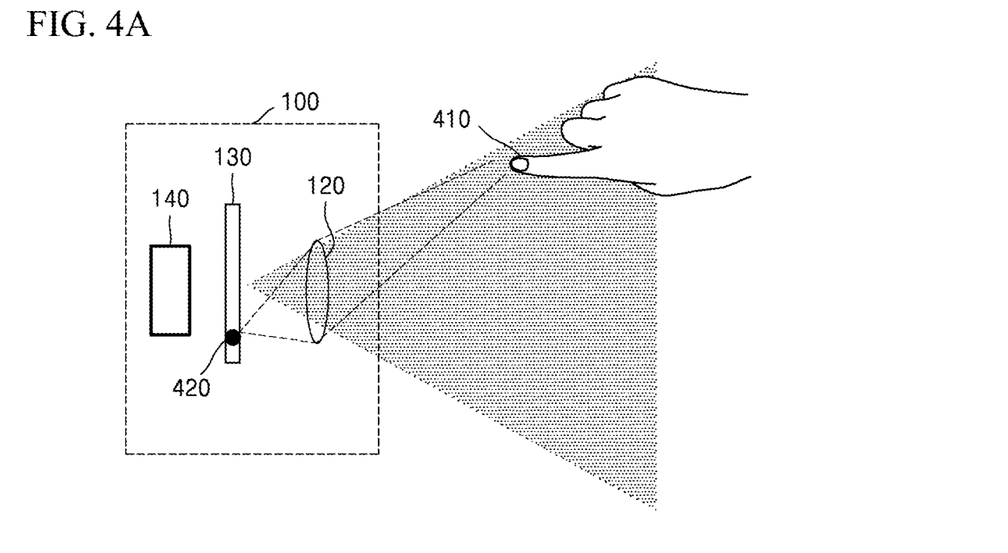
FIGS. 4A and 4B are views for explaining a method performed by the apparatus to track a movement of a subject along an x-axis of FIG. 2, according to at least one example embodiment.
Figure 4B:
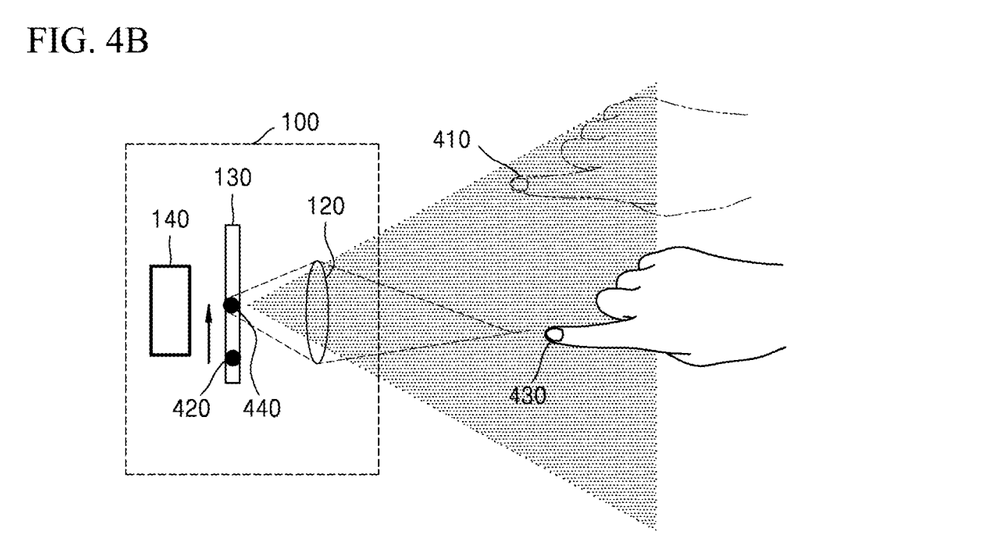

FIGS. 4A and 4B are views for explaining a method performed by the apparatus 100 to track a movement of a subject along the x-axis of FIG. 2, according to at least one example embodiment. FIGS. 4A and 4B illustrate the apparatus 100 seen in a negative direction of the y-axis of FIG. 2. The following will be explained on the assumption that the subject is a finger.

Referring to FIG. 4A, the light source 110 (not shown) emits light that passes through a slit to the finger at a desired (or alternatively, predetermined) angle. Part of the emitted light is scattered and reflected from the finger. The scattered and reflected light is collected by the lens 120 and is focused on a pixel that is located at a position 420 in the image sensor 130 including the pixel array that is a 2D pixel array.

Accordingly, the processor 140 may detect the pixel for receiving the collected light that is located at the position 420 in the image sensor 130 and may recognize a position 410 of the finger by detecting the pixel that is located at the position 420 corresponding to the position 410 of the finger. A process performed by the processor 140 to detect the pixel that is located at the position 420 in the image sensor 130 will be explained below in detail with reference to FIG. 7.

Referring to FIG. 4B, the finger moves from the position 410 of FIG. 4A to a position 430. Like in FIG. 4A, part of light emitted from the light source 110 (not shown) is scattered and reflected from the finger. Part of the scattered and reflected light is collected by the lens 120 and is focused on a pixel that is located at a position 440 in the image sensor 130.

Accordingly, the processor 140 may detect the pixel for receiving the collected light that is located at the position 440 in the image sensor 130 and may recognize the position 440 of the finger by detecting the pixel that is located at the position 440 corresponding to the position 430 of the finger. Also, as the finger moves from the position 410 to the position 430, the processor 140 may detect that the pixel for receiving the collected light in the image sensor 130 changes from the position 420 to the position 440, may detect a change in a position of the pixel for receiving the collected light in the image sensor 130, and may track a movement of the finger by using the detected change in the position of the pixel. Also, the processor 140 may recognize that as the finger moves in a positive direction of the x-axis, the position of the pixel for receiving the collected light in the image sensor 130 changes in a negative direction of the x-axis.

Figure 5:
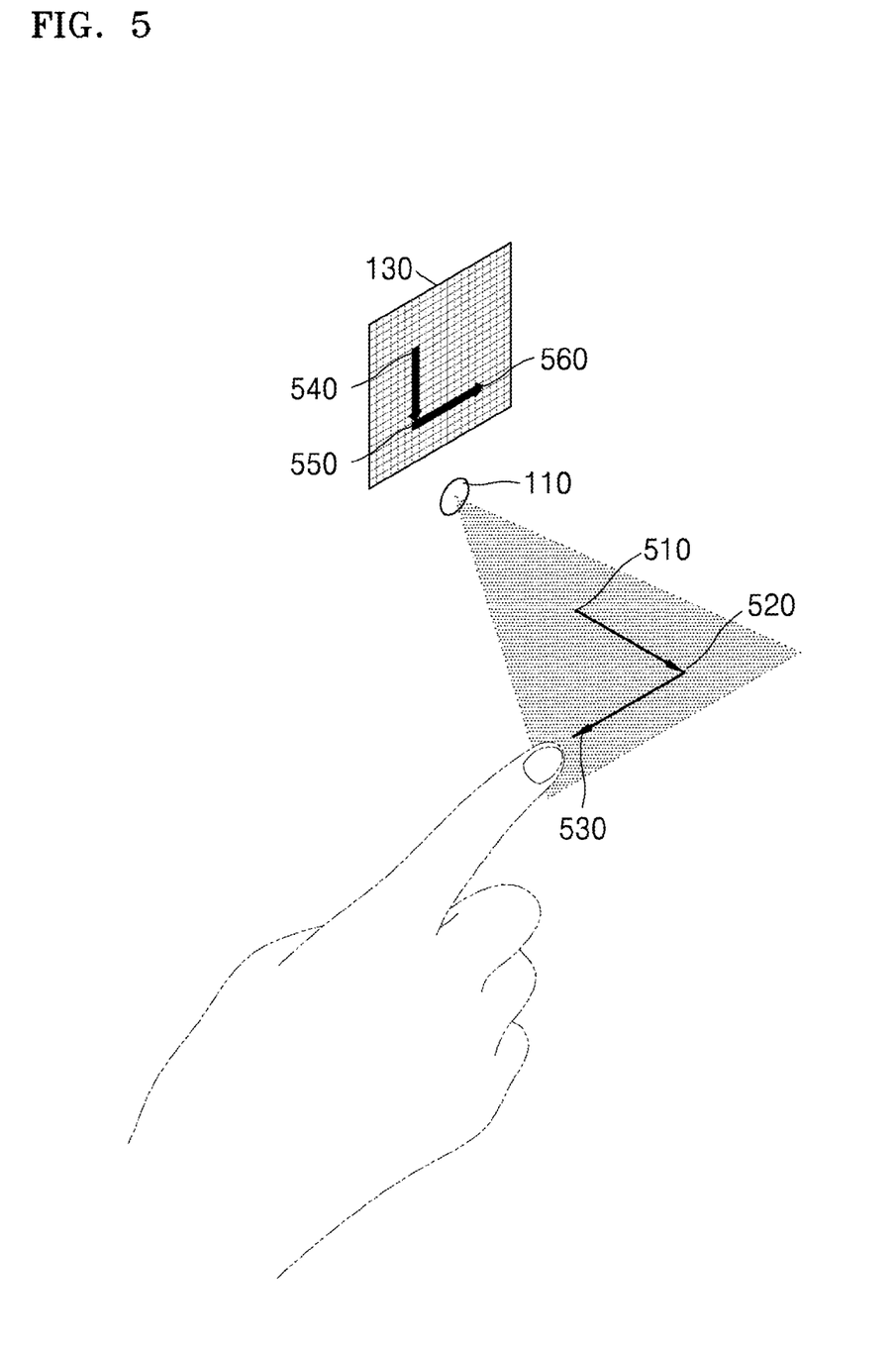
FIG. 5 is a view for explaining a process of recognizing a change in a position of a subject by combining the methods of FIGS. 3 and 4, according to at least one example embodiment.

FIG. 5 is a view for explaining a process of recognizing a change in a position of a subject by combining the methods of FIGS. 3 and 4, according to at least one example embodiment. The following will be explained on the assumption that the subject is a finger. Also, the image sensor 130 and the light source 110 of the apparatus 100 are shown and other elements are not shown for convenience. Also, scattering and reflecting from the finger and light collection using the lens 120 (not shown) will not be described here.

As shown in FIG. 5, light is emitted from the light source 110, the finger moves from a position 510 to a position 520 and then from the position 520 to a position 530 in order to form a 'ㄱ'. As the finger moves, a position of a pixel for receiving light in the image sensor 130 including the pixel array also changes. Accordingly, when the finger moves from the position 510 to the position 520, the pixel for receiving light changes from a position 540 to a position 550. Also, when the finger moves from the position 520 to the position 530, the pixel for receiving light changes from the position 550 to a position 560.

Accordingly, the apparatus 100 may recognize that the finger moves from the position 510 through the position 520 to the position 530 by detecting that the pixel for receiving light changes from the position 540 through the position 550 to the position 560.

Figure 6A:
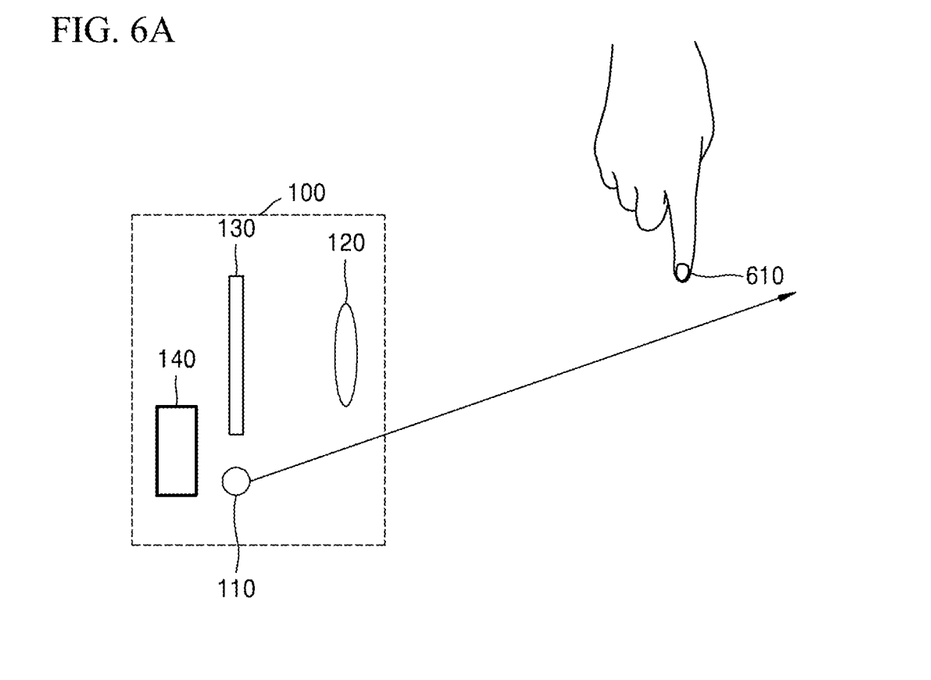
FIGS. 6A and 6B are views for explaining a method performed by the apparatus to track a movement of a subject along a y-axis of FIG. 2, according to at least one example embodiment.
Figure 6B:
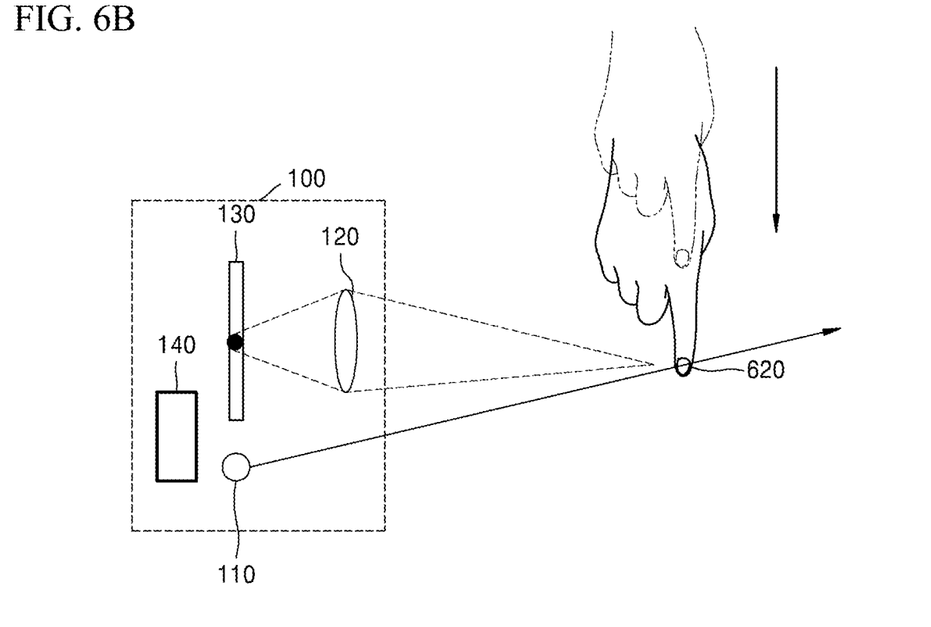

FIGS. 6A and 6B are views for explaining a method of recognizing a movement of a subject along the y-axis of FIG. 2, according to at least one example embodiment. FIGS. 6A and 6B illustrate the apparatus 100 seen in a negative direction of the x-axis of FIG. 2. The following will be explained on the assumption that the subject is a finger.

In FIG. 6A, the light source 110 emits light that passes through a slit to the finger at a desired (or alternatively, predetermined) angle. However, since the finger is located over the emitted light, the light is not scattered and reflected. Accordingly, the image sensor 130 does not receive light that is reflected or collected by the lens 120.

In FIG. 6B, the finger moves in a negative direction of the y-axis to a position 620. As the finger moves, the light emitted from the light source 110 is scattered and reflected from the finger, and the reflected light is collected by the lens 120 and is focused on the image sensor 130.

Accordingly, the processor 140 may detect a movement of the finger along the y-axis according to whether a pixel for receiving the collected light exists in the image sensor 130. That is, when a two-step sequence of no pixel detection and pixel detection occurs during a desired (or alternatively, predetermined) period of time, the processor 140 recognizes that the finger moves in the negative direction of the y-axis. Also, when a two-step sequence of pixel detection and no pixel detection occurs for a desired (or alternatively, predetermined) period of time, the processor 140 recognizes that the finger moves in a positive direction of the y-axis.

Figure 7:
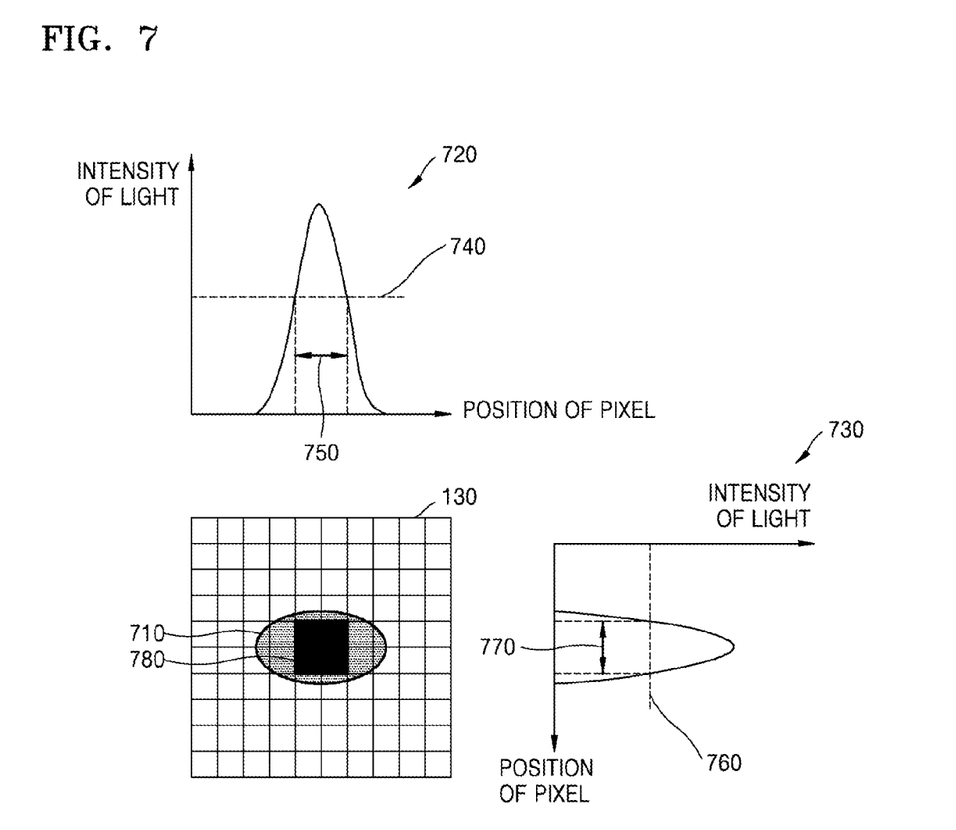
FIG. 7 is a diagram for explaining a method performed by the apparatus to detect a specific pixel that is located in an image sensor, according to at least one example embodiment.

FIG. 7 is a diagram for explaining a method performed by the apparatus 100 to detect a specific pixel for receiving light that is located in the image sensor 130, according to at least one example embodiment. That is, in detail, the processor 140 that is provided in the apparatus 100 detects the specific pixel for receiving light that is located in the image sensor 130.

According to at least one example embodiment, the image sensor 130 may include the pixel array that is a 2D pixel array as shown in FIG. 7. The number or shapes of pixels are not limited to those of FIG. 7. The image sensor 130 may receive light collected by the lens 120 of FIG. 1. As shown in FIG. 7, pixels of a desired (or alternatively, predetermined) area 710 may receive light. Although the desired (or alternatively, predetermined) area 710 for receiving light has an oval shape in FIG. 7, example embodiments are not limited thereto.

According to at least one example embodiment, the pixels that are included in the desired (or alternatively, predetermined) area 710 for receiving light receive pieces of light having different intensities. In an upper graph 720, the x-axis represents positions of pixels in a horizontal direction and the y-axis represents the intensities of the pieces of light received by the pixels. Also, in a right graph 730, the x-axis represents positions of pixels in a vertical direction and the y-axis represents intensities of pieces of light received by the pixels. It is found from the upper and right graphs 720 and 730, each having a Gaussian distribution, that an intensity of light in a middle portion is the highest and intensities of light decrease away from the middle portion. The Gaussian distribution is also not limited to that of FIG. 7.

According to at least one example embodiment, the processor 140 may set a critical value (or reference value) for an intensity of light and may detect only pixels for receiving pieces of light having greater intensities than the set critical value. The critical value (or reference value) may be user selected and/or based on empirical evidence. Accordingly, the processor 140 may set a critical value 740 in the upper graph 720 and may detect pixels for receiving pieces of light having greater intensities than the set critical value 740 in a desired (or alternatively) predetermined portion 750. Also, the processor 140 may set a critical value 760 in the right graph 730 and may detect pixels for receiving pieces of light having greater intensities than the set critical value 760 in a desired (or alternatively, predetermined) area 770. Accordingly, the processor 140 may detect pixels in an area 780 where the desired (or alternatively, predetermined) portions 750 and 770 of the upper and right graphs 720 and 730 are shared. That is, the processor 140 may set a critical value for an intensity of light, may detect a pixel for receiving light having a greater intensity than the set critical value, and may recognize a position of a subject corresponding to a position of the detected pixel.

Also, according to at least one example embodiment, the processor 140 may detect a pixel that is located at a central position from among a plurality of pixels for receiving light without using the afore-described method and may recognize a position of the pixel.

Figure 8:
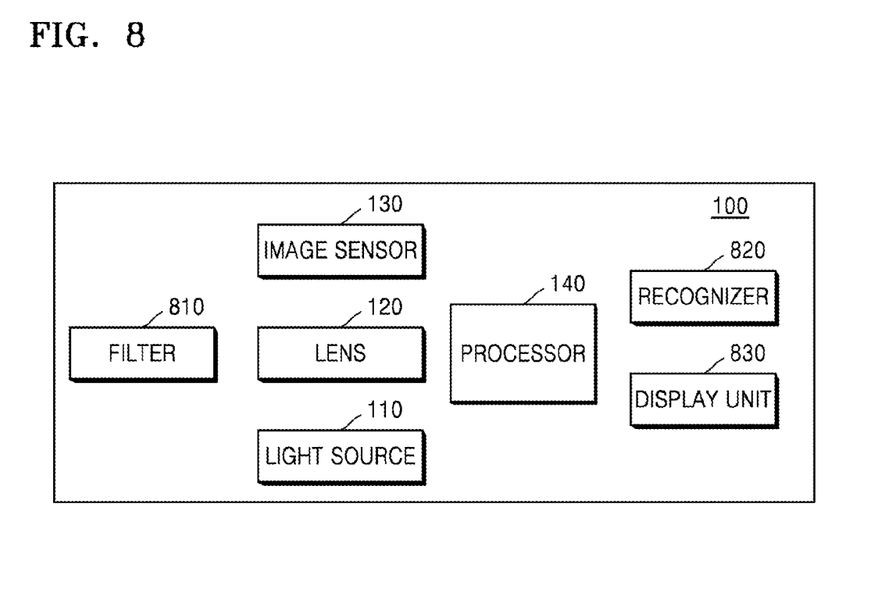
FIG. 8 is a block diagram illustrating the apparatus, according to at least one example embodiment.

FIG. 8 is a block diagram illustrating the apparatus 100 according to at least one example embodiment. The apparatus 100 may further include a filter 810, a recognizer 820, and a display unit 830 in addition to the light source 110, the lens 120, the image sensor 130, and the processor 140 of FIG. 1.

According to at least one example embodiment, the filter 810 may be a filter that may transmit therethrough only light having a desired (or alternatively, predetermined) wavelength. For example, when the light source 110 emits infrared light to a subject, the filter 810 may selectively transmit therethrough infrared light from among light reflected from the subject or light collected by the lens 120, which will be explained below in detail with reference to FIG. 9.

According to at least one example embodiment, the recognizer 820 may recognize a pattern according to a change in a position of a pixel detected by the processor 140. That is, as the subject moves, the position of the pixel for receiving light reflected from the subject in the pixel array of the image sensor 130 may change, and the recognizer 820 may recognize a pattern according to a change in the position of the pixel for receiving the reflected light, which will be explained below in detail with reference to FIG. 10. The functions of recognizer 820 may be performed by processor 140 or by a separate processor (not shown).

According to at least one example embodiment, the display unit 830 may display the pattern according to the change in the position of the pixel detected in the image sensor 130 by the processor 140. Also, the display unit 830 may include a display panel (not shown). Various examples of the display panel may include a liquid crystal display (LCD) panel, an organic light-emitting diode (OLED) display panel, an active-matrix (AM)-OLED panel, and a plasma display panel (PDP).

Also, according to at least one example embodiment, the apparatus 100 may include a marker (not shown) that helps to more accurately recognize a movement of the subject. For example, the marker that is attached to the subject may reduce scattering of light emitted from the light source 110, and thus light reflected from the subject may be more accurately focused on a specific pixel of the image sensor 130.

Figure 9:
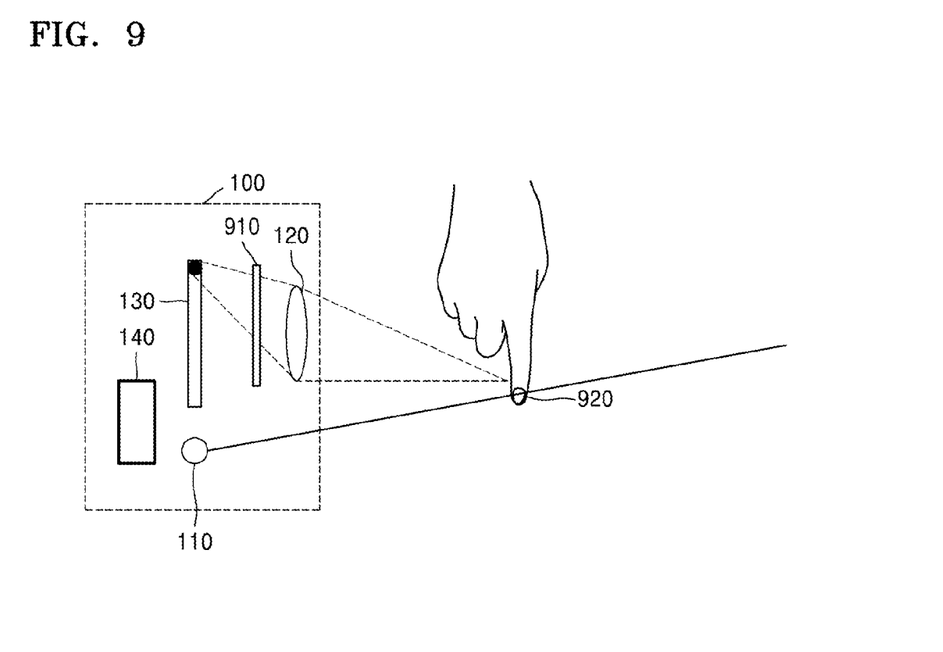
FIG. 9 is a view for explaining the apparatus including a filter, according to at least one example embodiment.

FIG. 9 is a view for explaining the apparatus 100 including a filter 910, according to at least one example embodiment.

According to at least one example embodiment, the light source 110 may emit infrared light to a subject. The emitted infrared light may be reflected from the subject, and the reflected light may be collected by the lens 120 and may be focused on the image sensor 130. In this case, the filter 910 that is disposed between the lens 120 and the image sensor 130 may selectively transmit therethrough only infrared light from among the collected light, and the image sensor 130 may receive only the collected infrared light. In this case, the image sensor 130 may be a sensor that selectively reacts to infrared light. Alternatively, unlike in FIG. 9, the filter 910 may be disposed between the lens 120 and a subject 920 and the lens 120 may function as the filter 910.

According to at least one example embodiment, light other than infrared light may be used.

Figure 10A:
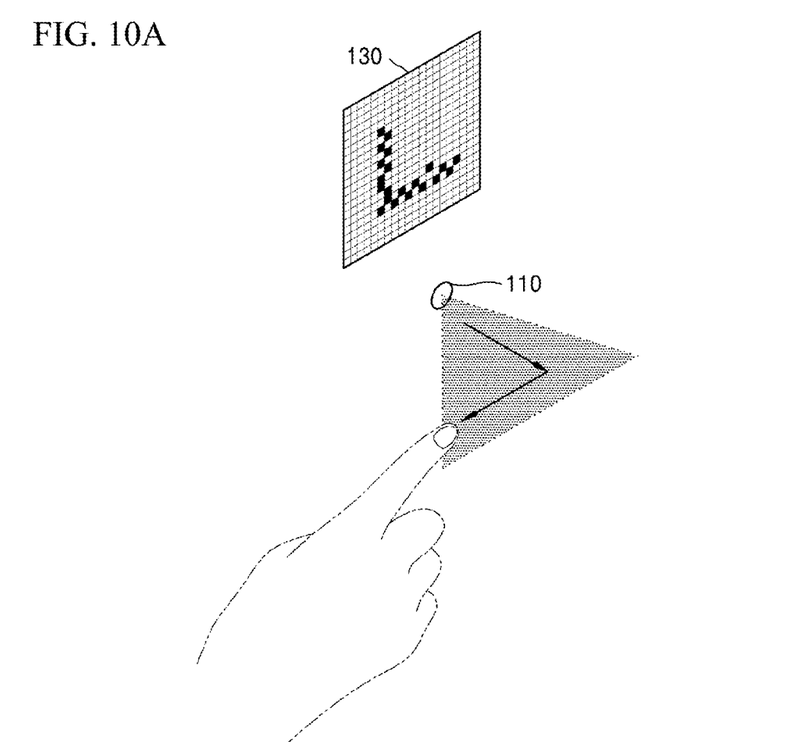
FIGS. 10A and 10B are views for explaining a function of a recognizer that is included in the apparatus, according to at least one example embodiment.
Figure 10B:
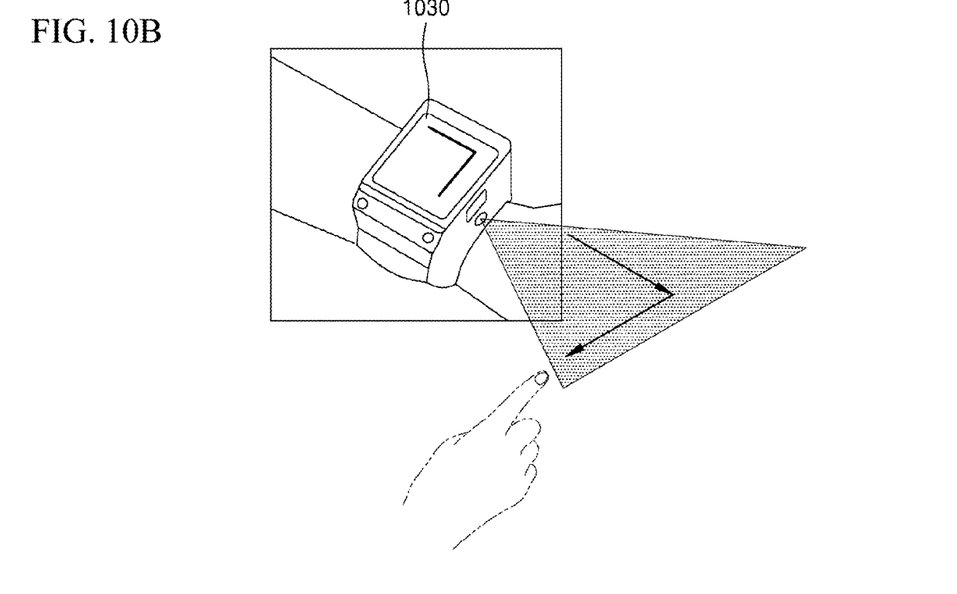

FIGS. 10A and 10B are views for explaining a function of the recognizer 820 that is included in the apparatus 100, according to at least one example embodiment. Also, in FIG. 10A, only the image sensor 130 and the light source 110 of the apparatus 100 are shown and other elements are not shown for convenience.

FIG. 10A is a view illustrating pixels detected by the image sensor 130 when a finger moves on a side surface of the apparatus 100 to form a letter 'ㄱ'. Although the finger smoothly moves to form the letter 'ㄱ', actually, the pixels detected by the image sensor 130 may not be smooth. In this case, the recognizer 820 may recognize the letter (or symbol) 'ㄱ' by recognizing a pattern according to a change in positions of the pixels detected by the image sensor 130. The recognizer 820 may recognize the letter 'ㄱ' by learning a pattern according to a change in positions of many pixels corresponding to the letter 'ㄱ'. Although the letter 'ㄱ' is used in FIG. 10A, example embodiments are not limited thereto and any letter may be used.

Also, a user may set that the recognizer 820 may recognize a specific pattern. For example, the user may set that a movement of a subject along a y-axis is recognized as a 'click' input of the apparatus 100. That is, when the processor 140 detects that for a desired (or alternatively, predetermined) period of time, there is a pixel that is not detected by the image sensor 130, is detected again, and is not detected again, the recognizer 820 may recognize such a movement of the subject along the y-axis as a 'click' input.

FIG. 10B is a view illustrating that the letter 'ㄱ' recognized by the recognizer 820 in FIG. 10A is displayed on a display unit 1030 that is included in the apparatus 100, according to at least one example embodiment.

The apparatus 100 according to at least one example embodiment may be mounted on a portable device such as a wearable device or a smart phone, and thus may be used as a motion recognition apparatus in any of various user interfaces such as a handwritten letter recognition input device in a near area. Also, the apparatus 100 may be used as a device for detecting an absolute position of a specific object in a coordinate system in the industry.

Figure 11:
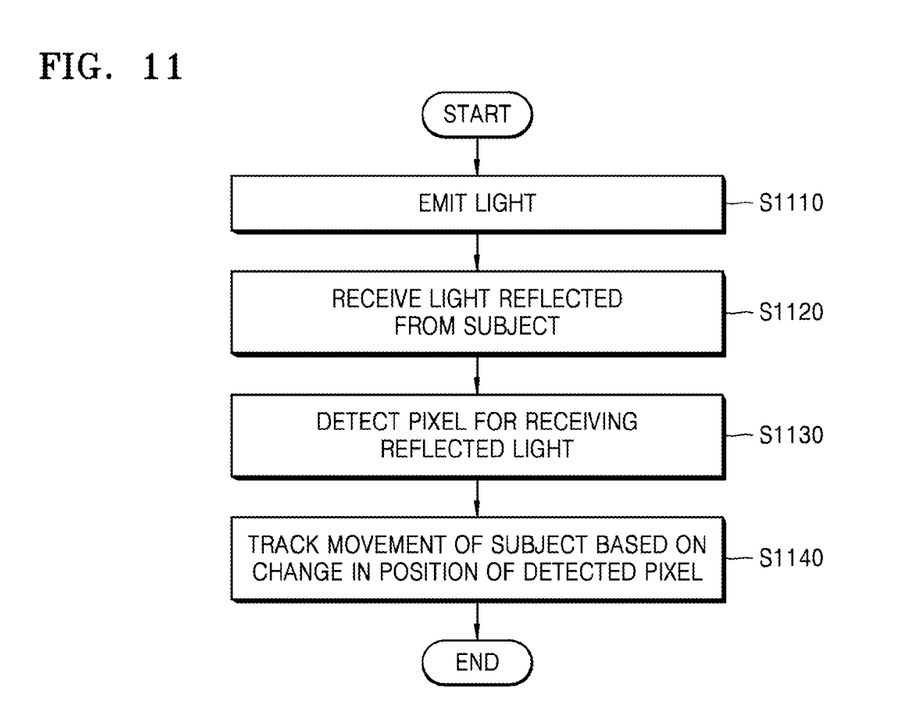
FIG. 11 is a flowchart of a method of recognizing a movement of a subject, according to at least one example embodiment.

FIG. 11 is a flowchart of a method performed by the apparatus 100 of FIG. 1 to recognize a movement of a subject, according to at least one example embodiment.

In operation S1110, the light source 110 that is included in the apparatus 100 may emit light to the subject. The light source 110 may emit light at a desired (or alternatively, preset) angle, and the light may be light that passes through a slit. Also, the light source 110 may emit light having a desired (or alternatively, predetermined) wavelength such as infrared light.

In operation S1120, the image sensor 130 that is included in the apparatus 100 may receive light reflected from the subject. Also, the lens 120 that is included in the apparatus 100 may collect part of the light reflected from the subject, and the image sensor 130 may receive the collected light. According to at least one example embodiment, the image sensor 130 may include a pixel array, and a specific pixel in the pixel array may receive the light collected by the lens 120.

In operation S1130, the apparatus 100 may detect a pixel for receiving the light that is reflected from the subject or collected by the lens 120 in the pixel array of the image sensor 130. According to at least one example embodiment, when the apparatus 100 detects a specific pixel for receiving light, it may mean that the processor 140 may detect the specific pixel for receiving light in the image sensor 130 and may recognize a position of the specific pixel in the pixel array. Accordingly, a position of the detected pixel and a position of the subject may correspond to each other in a one-to-one manner. A process performed by the apparatus 100 to detect the pixel for receiving light will be explained below in detail with reference to FIG. 12.

In operation S1140, the apparatus 100 may track a movement of the subject based on a change in the position of the pixel detected in operation S1130. That is, the apparatus 100 may detect the change in the position of the pixel for receiving the reflected or collected light according to the movement of the subject and may track the movement of the subject by using the change in the position of the detected pixel. Also, according to at least one example embodiment, the apparatus 100 may calculate a distance by which the subject moves based on the amount of the change in the position of the detected pixel.

Figure 12:
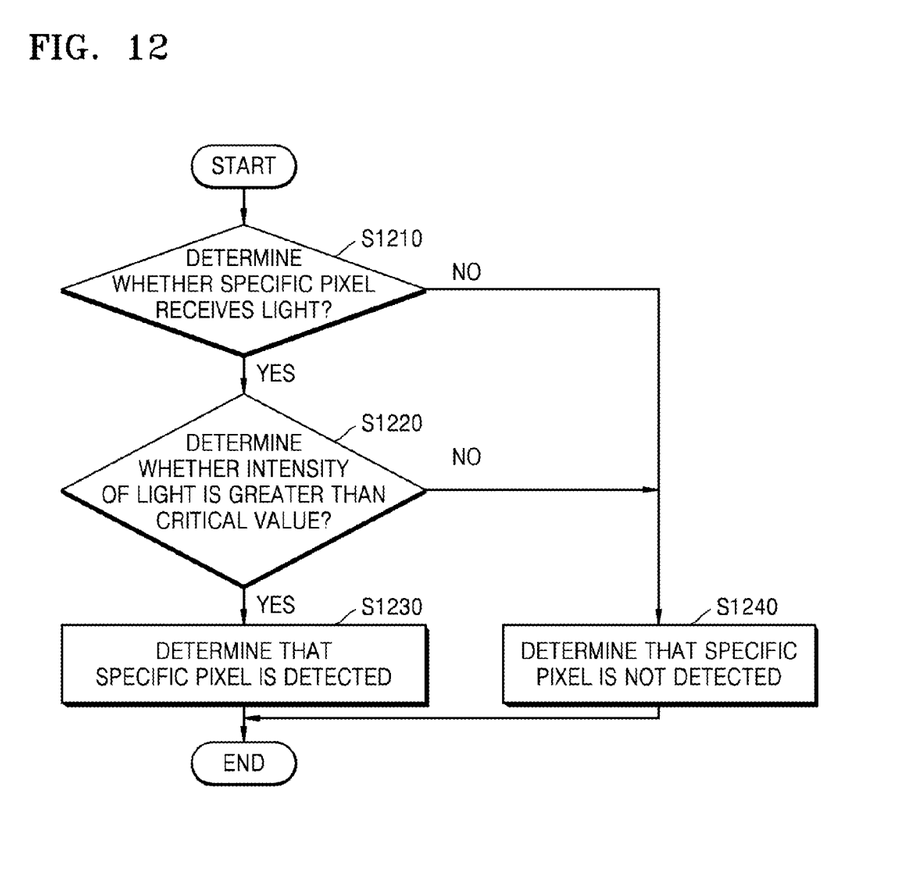
FIG. 12 is a flowchart of an operation of detecting a specific pixel in a pixel array that is included in the image sensor in the method of FIG. 11, according to at least one example embodiment.

FIG. 12 is a flowchart of operation S1130 in the method of FIG. 11, according to at least one example embodiment.

In operation S1210, the apparatus 100 determines whether a specific pixel receives light that is reflected from the subject or light that is collected by the lens 120 in the pixel array that is included in the image sensor 130. If it is determined in operation S1210 that the specific pixel does not receive the light, the method proceeds to operation S1240. In operation S1240, it is determined that the specific pixel is not detected by the apparatus 100.

Otherwise, if it is determined in operation S1210 that the specific pixel receives the light, the method proceeds to operation S1220. In operation S1220, the apparatus 100 determines whether an intensity of the light received by the specific pixel is greater than a desired (or alternatively, predetermined) critical value (or reference value). The desired (or alternatively, predetermined) critical value may be preset by the apparatus 100. If it is determined in operation S1220 that the intensity of the light is not greater than the desired (or alternatively, predetermined) critical value, the method proceeds to operation S1240. In operation S1240, it is determined that the specific pixel is not detected by the apparatus 100.

Otherwise, if it is determined in operation S1220 that the intensity of the light received by the specific pixel is greater than the desired (or alternatively, predetermined) critical value, the method proceeds to operation S1230. In operation S1230, it is determined that the specific pixel is detected by the apparatus 100.

Also, according to at least one example embodiment, the apparatus may detect a pixel that is located at a central position from among a plurality of pixels for receiving light without the afore-described method and may recognize a position of the pixel.

As described above, according to at least one example embodiment, since a position of a subject and a position of a pixel in an image sensor correspond to each other, a movement of the subject may be tracked by detecting a change in the position of the pixel.

The device described herein may include a processor, a memory for storing program data and executing it, a permanent storage unit such as a disk drive, a communications port for handling communication with external devices, and user interface devices, including a touch panel, keys, buttons, etc. When software modules or algorithms are involved, these software modules may be stored as program instructions or computer-readable codes executable on a processor on a computer-readable recording medium. Examples of the computer-readable recording medium include magnetic storage media (e.g., read-only memories (ROMs), random-access memories (RAMs) floppy disks, hard disks, etc.), and optical recording media (e.g., compact disc (CD)-ROMs, or digital versatile discs (DVDs)). The computer-readable recording medium can also be distributed over network-coupled computer systems so that the computer-readable code is stored and executed in a distributive manner. This media can be read by the computer, stored in the memory, and executed by the processor.

Inventive concepts may be described in terms of functional block components and various processing steps. Such functional blocks may be realized by any number of hardware and/or software components configured to perform the specified functions. For example, inventive concepts may employ various integrated circuit (IC) components, e.g., memory elements, processing elements, logic elements, look-up tables, and the like, which may carry out a variety of functions under the control of one or more microprocessors or other control devices. Similarly, where the elements of inventive concepts are implemented using software programming or software elements, the inventive concept may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, inventive concepts could employ any number of conventional techniques for electronics configuration, signal processing and/or control, data processing and the like. The words "mechanism", "element", "unit", and "configuration" are used broadly and are not limited to mechanical or physical embodiments, but can include software routines in conjunction with processors, etc.

The particular implementations shown and described herein are illustrative examples of inventive concepts and are not intended to otherwise limit the scope of inventive concepts in any way. For the sake of brevity, conventional electronics, control systems, software development and other functional aspects of the systems may not be described in detail. Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device. Moreover, no item or component is essential to the practice of inventive concepts unless the element is specifically described as "essential" or "critical".

The use of the terms "a", "an", and "the" and similar referents in the context of describing inventive concepts (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. Inventive concepts are not limited to the described order of the steps. The use of any and all examples, or example language (e.g., "such as") provided herein, is intended merely to better illuminate inventive concepts and does not pose a limitation on the scope of inventive concepts unless otherwise claimed. It will be understood by one of ordinary skill in the art that numerous modifications and adaptations will be made according to design conditions and factors without departing from the spirit and scope of inventive concepts.

What is claimed is:

1. An apparatus for recognizing a movement of a subject, the apparatus comprising:
    a light source configured to emit light to the subject;
    a single image sensor configured to receive light reflected from the subject; and
    a processor configured to,
        detect a pixel that receives the reflected light, the pixel being in a pixel array of the single image sensor, and
        track the movement of the subject based on a change in a position of the detected pixel,
        wherein a pattern of the movement of the subject is reflected in changes in the position of the detected pixel in the single image sensor, and
        the processor is further configured to recognize the pattern according to the changes in the position of the detected pixel in the single image sensor and to calculate a distance by which the subject moves based on an amount of the changes in the position of the detected pixel in the single image sensor.

2. The apparatus of claim 1, further comprising:
    a filter configured to filter the reflected light to transmit light having a desired wavelength,
    wherein the processor is configured to detect the pixel using the transmitted light having the desired wavelength.

3. The apparatus of claim 1, wherein the processor is configured to set a reference value for an intensity of light, and the detected pixel in the single image sensor having an intensity that is greater than the reference value.

4. The apparatus of claim 1, wherein the pixel is in a plurality of pixels in the pixel array, and the detected pixel in the single image sensor is located at a central position among the plurality of pixels.

5. The apparatus of claim 1, further comprising:
    a lens configured to collect the reflected light such that the single image sensor receives the reflected light collected by the lens.

6. The apparatus of claim 1, wherein the light source is configured to emit light that passes through an opening.

7. The apparatus of claim 1, further comprising:
    a display configured to display a pattern according to the change in the position of the detected pixel in the single image sensor.

8. The apparatus of claim 1, wherein the processor is configured to adjust an angle at which the light source emits the light and the processor is configured to recognize the pattern based on the light emitted from the adjusted angle.

9. A method of recognizing a movement of a subject, the method comprising:
    emitting, by a light source, light to the subject;
    receiving, by a single image sensor, light reflected from the subject;
    detecting a pixel that is receiving the reflected light, the pixel being included in a pixel array of the single image sensor;
    tracking the movement of the subject based on a change in a position of the detected pixel in the single image sensor, wherein a pattern of the movement of the subject is reflected in changes in the position of the detected pixel in the single image sensor;
    recognizing the pattern according to the changes in the position of the detected pixel in the single image sensor; and
    calculating a distance by which the subject moves based on an amount of the changes in the position of the detected pixel in the single image sensor.

10. The method of claim 9, further comprising:
    filtering the reflected light to transmit light having a desired wavelength,
    wherein the detecting comprises detecting the pixel using the transmitted light having the desired wavelength.

11. The method of claim 9, wherein the detecting comprises:
    setting a reference value for an intensity of light, and the detected pixel in the single image sensor having an intensity that is greater than the set reference value.

12. The method of claim 9, wherein the pixel is in a plurality of pixels in the pixel array, and the detected pixel in the single image sensor located at a central position among the plurality of pixels.

13. The method of claim 9, wherein the receiving light reflected from the subject comprises:
    receiving the light reflected from the subject through a lens.

14. The method of claim 9, wherein the light emitted to the subject is light that passes through an opening.

15. The method of claim 9, further comprising:
    displaying a pattern according to the change in the position of the detected pixel in the single image sensor.

16. The method of claim 9, further comprising:
    adjusting an angle at which the light source emits the light, wherein the recognizing is based on the adjusting.

17. A non-transitory computer-readable recording medium having embodied thereon a program, which when executed by a computer, performs a method of recognizing a movement of a subject, where in the method comprises:
    emitting light to the subject;
    receiving, by a single image sensor, light reflected from the subject;
    detecting a pixel that is receiving the reflected light, the pixel being included in a pixel array of the single image sensor;
    tracking the movement of the subject based on a change in a position of the detected pixel in the single image sensor, wherein a pattern of the movement of the subject is reflected in changes in the position of the detected pixel in the single image sensor;
    recognizing the pattern according to the changes in the position of the detected pixel in the single image sensor; and
    calculating a distance by which the subject moves based on an amount of the changes in the position of the detected pixel in the single image sensor.

* * * * *